US012343724B2

(12) United States Patent
Hu et al.

(10) Patent No.: US 12,343,724 B2
(45) Date of Patent: Jul. 1, 2025

(54) DETECTION CHIP, METHOD FOR USING DETECTION CHIP, AND DETECTION APPARATUS

(71) Applicants: BEIJING BOE HEALTH TECHNOLOGY CO., LTD., Beijing (CN); BOE TECHNOLOGY GROUP CO., LTD., Beijing (CN)

(72) Inventors: Lijiao Hu, Beijing (CN); Haochen Cui, Beijing (CN); Xiaohe Shen, Beijing (CN); Chungen Yuan, Beijing (CN); Tao Hu, Beijing (CN); Jing Li, Beijing (CN); Weiqiong Gan, Beijing (CN)

(73) Assignees: BEIJING BOE HEALTH TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 803 days.

(21) Appl. No.: 17/614,601

(22) PCT Filed: Feb. 1, 2021

(86) PCT No.: PCT/CN2021/074637
§ 371 (c)(1),
(2) Date: Nov. 29, 2021

(87) PCT Pub. No.: WO2021/164531
PCT Pub. Date: Aug. 26, 2021

(65) Prior Publication Data
US 2022/0226824 A1 Jul. 21, 2022

(30) Foreign Application Priority Data
Feb. 20, 2020 (CN) ......................... 202010104107.6

(51) Int. Cl.
*B01L 3/00* (2006.01)

(52) U.S. Cl.
CPC ... *B01L 3/502753* (2013.01); *B01L 3/502707* (2013.01); *B01L 2200/0689* (2013.01); *B01L 2300/0861* (2013.01)

(58) Field of Classification Search
CPC ......... B01L 3/502738; B01L 3/502753; B01L 3/567; B01L 2200/0652; B01L 2200/0689;
(Continued)

(56) References Cited

U.S. PATENT DOCUMENTS 7,892,493 B2 2/2011 Weekamp
8,703,476 B2 4/2014 De Gier et al.
(Continued)

FOREIGN PATENT DOCUMENTS

CN 1922480 A 2/2007
CN 1945328 A 4/2007
(Continued)

OTHER PUBLICATIONS

First Office Action issued in Chinese Patent Application No. 202010104107.6 with search report.

*Primary Examiner* — Jennifer Wecker
*Assistant Examiner* — Britney N. Washington
(74) *Attorney, Agent, or Firm* — Chiwin Law LLC

(57) ABSTRACT

A detection chip, a method for using a detection chip and a detection apparatus are provided the detection chip includes a chip substrate and the chip substrate includes a fluid channel and a plurality of liquid cells. The fluid channel is arranged on a surface if the chip substrate and includes a main path and a plurality of branch paths. The plurality of branch paths are respectively communicated to the plurality of liquid cells, the plurality of branch paths are all communicated to the main path, and communication points between the plurality of branch paths and the main path are different.
(Continued)

The plurality of branch paths are configured to allow liquid in the plurality of branch paths to be capable of merging into the main path in a same direction.

12 Claims, 8 Drawing Sheets

(58) Field of Classification Search
CPC ........... B01L 2200/10; B01L 2300/049; B01L 2300/0816; B01L 2300/123; B01L 2400/0638; B01L 2200/0668; B01L 2300/0887; B01L 2400/043; B01L 2400/0481; B01L 2400/0655; B01L 3/50273; B01L 2300/0819; B01L 2400/0487
See application file for complete search history.

(56) References Cited

U.S. PATENT DOCUMENTS

2005/0266582 A1* 12/2005 Modlin .................. G01N 21/77 436/164
2007/0082331 A1 4/2007 Tanaami et al.
2007/0245810 A1* 10/2007 Carter .................. G01N 29/022 73/53.01
2012/0178091 A1* 7/2012 Glezer .................. B01L 3/5027 435/6.12
2018/0093269 A1* 4/2018 Rachamim ........ B01L 3/502738

FOREIGN PATENT DOCUMENTS

| | | | |
|---|---|---|---|
| CN | 101213022 | A | 7/2007 |
| CN | 101500709 | A | 8/2009 |
| CN | 101750488 | A | 6/2010 |
| CN | 102866257 | A | 1/2013 |
| CN | 104374903 | A | 5/2015 |
| CN | 106238109 | A | 12/2016 |
| CN | 209014586 | U | 6/2019 |
| CN | 209559909 | U | 10/2019 |
| CN | 209624608 | U | 11/2019 |
| DE | 19755479 | A1 | 6/1999 |

* cited by examiner

DETECTION CHIP, METHOD FOR USING DETECTION CHIP, AND DETECTION APPARATUS

This application is a U.S. National Phase Entry of International Application No. PCT/CN2021/074637, filed on Feb. 1, 2021, designating the United States of America and claiming priority to Chinese Patent Application No. 202010104107.6, filed on Feb. 20, 2020. The present application claims priority to and the benefit of the above-identified applications and the above-identified applications are incorporated by reference herein in their entirety.

TECHNICAL FIELD

Embodiments of the present disclosure relate to a detection chip, a method for using a detection chip, and a detection apparatus.

BACKGROUND

Microfluidic chip technology integrates basic operation units of sample preparation, reaction, separation, and detection involved in fields such as biology, chemistry, and medicine into a chip with micrometer-scale microchannels to automatically complete the entire process of reaction and analysis. The chip used in this process is referred to as a microfluidic chip, which can also be referred to as a lab-on-a-chip. The microfluidic chip technology has advantages of small sample consumption, fast analysis speed, easy to constitute portable instruments, and suitable for instant and on-site analysis, and has been widely used in many fields such as biology, chemistry and medicine.

SUMMARY

At least one embodiment of the present disclosure provides a detection chip, which comprises a chip substrate. The chip substrate comprises a fluid channel and a plurality of liquid cells, and the fluid channel is arranged on a surface of the chip substrate and comprises a main path and a plurality of branch paths. The plurality of branch paths are respectively communicated to the plurality of liquid cells, the plurality of branch paths are all communicated to the main path, and communication points between the plurality of branch paths and the main path are different, and the plurality of branch paths are configured to allow liquid in the plurality of branch paths to be capable of merging into the main path in a same direction.

For example, in the detection chip provided by an embodiment of the present disclosure, an aspect ratio of any one of the main path and the branch paths of the fluid channel ranges from 0.4 to 0.6.

For example, in the detection chip provided by an embodiment of the present disclosure, the fluid channel further comprises an extraction region, and the extraction region is communicated to the main path.

For example, the detection chip provided by an embodiment of the present disclosure further comprises a sealing film, and the sealing film covers the surface of the chip substrate having the fluid channel.

For example, in the detection chip provided by an embodiment of the present disclosure, the sealing film comprises an elastic film.

For example, in the detection chip provided by an embodiment of the present disclosure, the fluid channel further comprises a plurality of flow paths and a plurality of film valve parts. The chip substrate further comprises a reaction cell and a waste liquid cell, the reaction cell is configured to contain liquid that needs to be subjected to an amplification reaction, and the waste liquid cell is configured to contain waste liquid generated in the extraction region during reaction process, and the reaction cell and the waste liquid cell are respectively communicated to the extraction region through the plurality of flow paths. The plurality of film valve parts are respectively in the plurality of flow paths, and a film valve part of the plurality of film valve parts is configured to allow a portion of the sealing film covering the film valve part to approach and separate, so as to correspondingly close and open a flow path.

For example, in the detection chip provided by an embodiment of the present disclosure, the reaction cell comprises a porous structure, the porous structure comprises a plurality of pore-shaped parts, and the plurality of pore-shaped parts are configured to contain same or different amplification primers.

For example, in the detection chip provided by an embodiment of the present disclosure, the porous structure further comprises a connecting channel and a plurality of connecting byroads, the plurality of connecting byroads are all communicated to the connecting channel, and an extending direction of the connecting byroads is perpendicular to an extending direction of the connecting channel. The plurality of pore-shaped parts are respectively communicated to the plurality of connecting byroads, respectively, and the plurality of pore-shaped parts are arranged in a row along a direction parallel to the extending direction of the connecting channel.

For example, in the detection chip provided by an embodiment of the present disclosure, the pore-shaped parts comprise air-permeable holes, and the air-permeable holes are covered with an air-permeable and liquid-impermeable film.

For example, in the detection chip provided by an embodiment of the present disclosure, a liquid cell of the plurality of liquid cells comprises a double-layer film sealing structure, the double-layer film sealing structure comprises two layers of liquid sealing films, the two layers of liquid sealing films are stacked in a direction perpendicular to the chip substrate and have a spacing, and the two layers of liquid sealing films define an enclosed space in the liquid cell.

For example, the detection chip provided by an embodiment of the present disclosure further comprises a piercing mechanism and a piercing mechanism limit plate. The piercing mechanism comprises a plurality of columnar parts, the piercing mechanism limit plate is arranged on a side of the chip substrate away from the fluid channel, and comprises a plurality of openings corresponding to the plurality of columnar parts, and the plurality of columnar parts are arranged in the plurality of openings.

For example, in the detection chip provided by an embodiment of the present disclosure, a columnar part of the plurality of columnar parts is movable in an opening along an axial direction of the opening, and is configured to not only pierce the double-layer film sealing structure but also seal the liquid cell.

For example, in the detection chip provided by an embodiment of the present disclosure, an end of the columnar part close to the chip substrate is made of a rigid material, and an end of the columnar part away from the chip substrate is made of an elastic material.

For example, the detection chip provided by an embodiment of the present disclosure further comprises an adhesive layer. The adhesive layer is between the chip substrate and the sealing film, and is configured to adhere the chip substrate to the sealing film, and the adhesive layer exposes the fluid channel of the chip substrate.

At least one embodiment of the present disclosure further provides a detection apparatus, adapted to operate the detection chip described above. The detection apparatus comprises a piercing mechanism control unit. In the case where the detection chip comprises a piercing mechanism, the liquid cell comprises a double-layer film sealing structure, and the fluid channel comprises an extraction region, the piercing mechanism control unit is configured to be capable of installing the detection chip, and in the case where the detection chip is installed in the piercing mechanism control unit, the piercing mechanism control unit is configured to control the piercing mechanism to pierce the double-layer film sealing structure, so that the liquid in the plurality of liquid cells flows into the extraction region through the main path.

For example, the detection apparatus provided by an embodiment of the present disclosure further comprises a film valve control unit and a film drive unit. In the case where the detection chip further comprises a sealing film, the fluid channel further comprises a film valve part and a flow path, and the chip substrate comprises a reaction cell, the film valve control unit comprises at least one protruding part, and the at least one protruding part is movable to control whether a portion of the sealing film covering the film valve part approaches the film valve part, or is separated from the film valve part in the case where the detection chip is installed in the piercing mechanism control unit, so as to correspondingly close and open the flow path. The film drive unit is configured to apply pressure to a portion of the sealing film covering the extraction region in the case where the detection chip is installed in the piercing mechanism control unit, so that the portion of the sealing film covering the extraction region is deformed.

At least one embodiment of the present disclosure further provides a method for using the detection chip described above. The method comprises: causing the liquid in the plurality of liquid cells to merge into the main path through the plurality of branch paths.

BRIEF DESCRIPTION OF THE DRAWINGS

In order to clearly illustrate the technical solutions of the embodiments of the present disclosure, the drawings of the embodiments will be briefly described in the following. It is obvious that the described drawings are only related to some embodiments of the present disclosure and thus are not limitative to the present disclosure.

DETAILED DESCRIPTION

Figure 1:
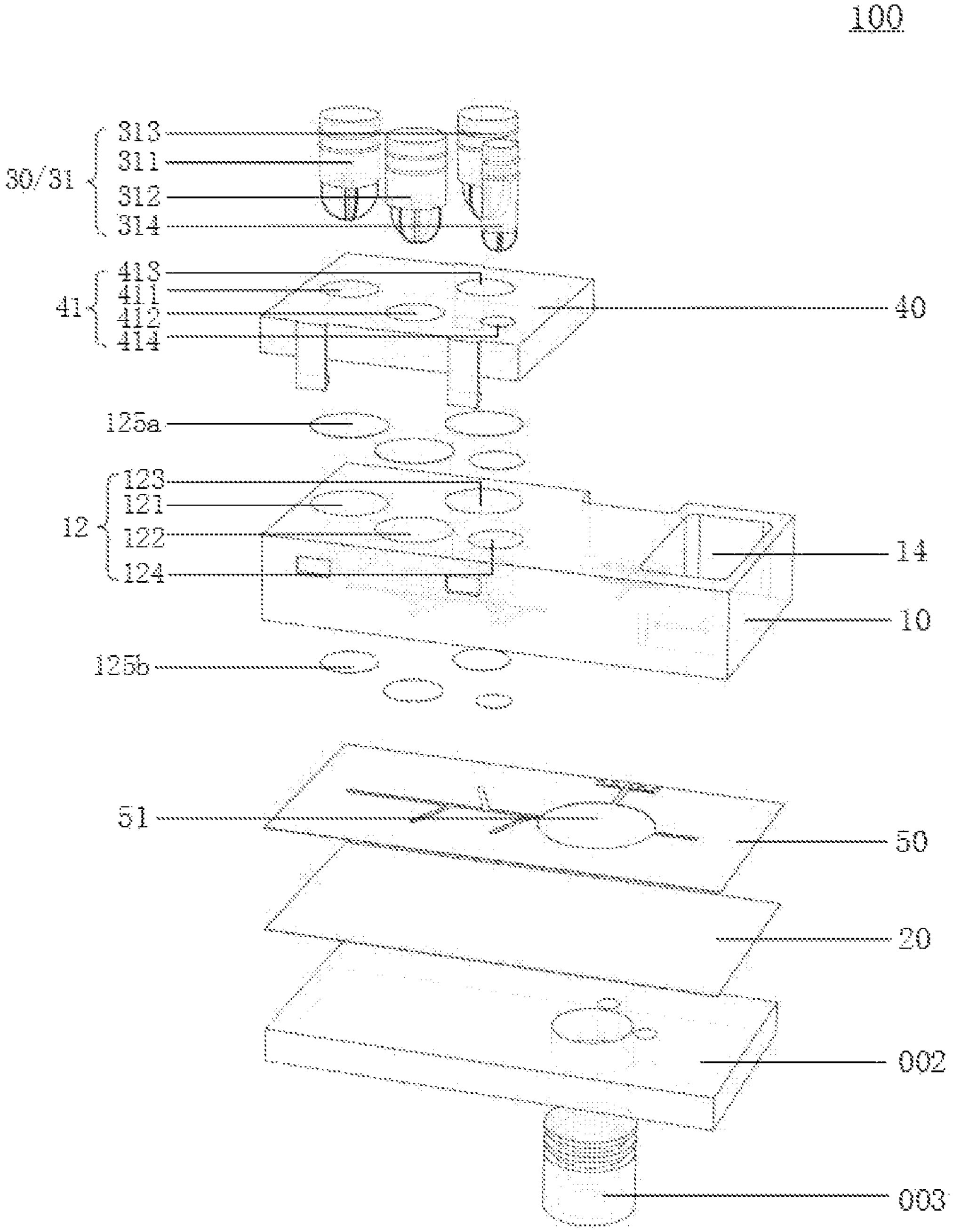
FIG. 1 is a perspective exploded view of a three-dimensional structure of a detection chip provided by at least one embodiment of the present disclosure.

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect," "connected," "coupled," etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In the design process of a microfluidic chip, it is usually desirable to integrate as many functions of analysis and detection on the chip as possible so as to reduce the chip's dependence on external operations, thereby achieving automation and integration. Microfluidic chips are mostly disposable products, which can omit complicated liquid path systems for cleaning and waste liquid treatment, and avoid pollution caused by the liquid path systems. In order to achieve integration, the reagent containing part can be arranged in the microfluidic chip so as to contain various reagents required for analysis and detection. For a general microfluidic chip with reagent containing function, the chip structure is relatively complicated, or the preparation process is relatively complicated, which causes high cost of the microfluidic chip as a consumable. Meanwhile, the process of the microfluidic chip capable of multiple detections is more complicated and the cost is higher.

At least one embodiment of the present disclosure provides a detection chip, a method for using a detection chip, and a detection apparatus. The detection chip has a simple structure, and can solve the problem of liquid mixture of different reagents and the problem of residue in a shared flow channel without adding a sealing valve.

Hereinafter, embodiments of the present disclosure will be explained in detail with reference to the drawings. It should be noted that same reference numerals in different drawings will be used to indicate same elements that have been described.

At least one embodiment of the present disclosure provides a detection chip. The detection chip includes a chip substrate. The chip substrate includes a fluid channel and a plurality of liquid cells. The fluid channel is arranged on a surface of the chip substrate and includes a main path and a plurality of branch paths. The plurality of branch paths are respectively communicated to the plurality of liquid cells, the plurality of branch paths are all communicated to the main path, and communication points between the plurality of branch paths and the main path are different. The plurality of branch paths are configured to allow liquid in the plurality of branch paths to be capable of merging into the main path in a same direction.

Figure 2:
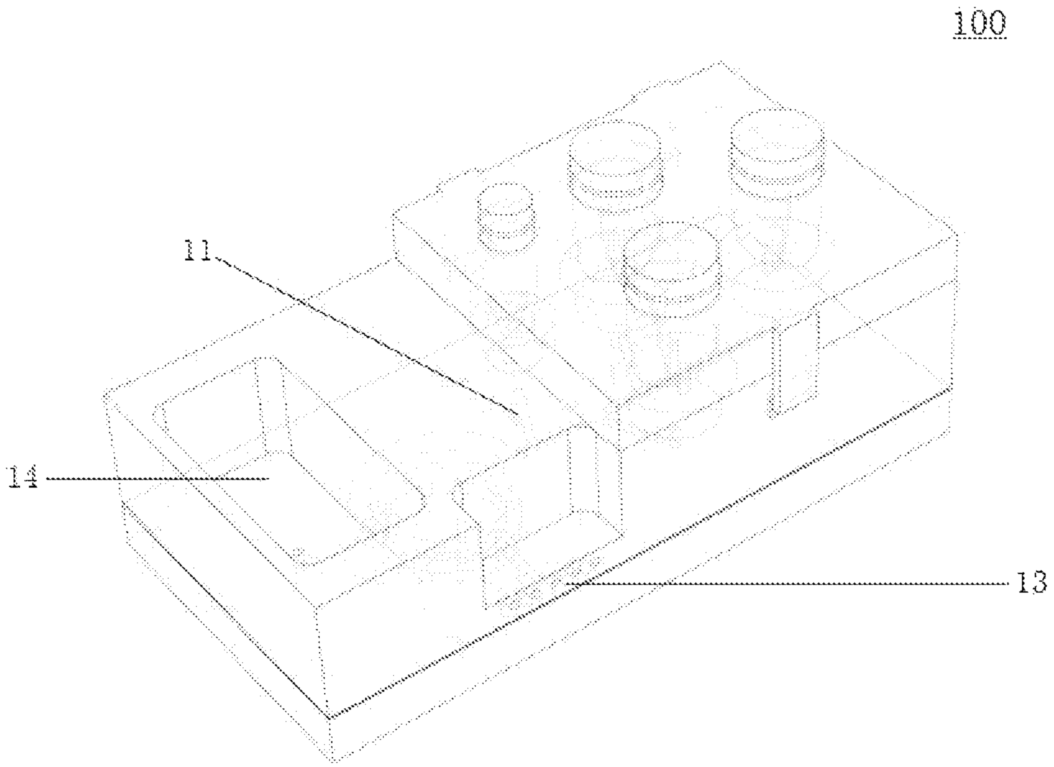
FIG. 2 is perspective view of the three-dimensional structure of the detection chip illustrated in FIG. 1.
Figure 3:
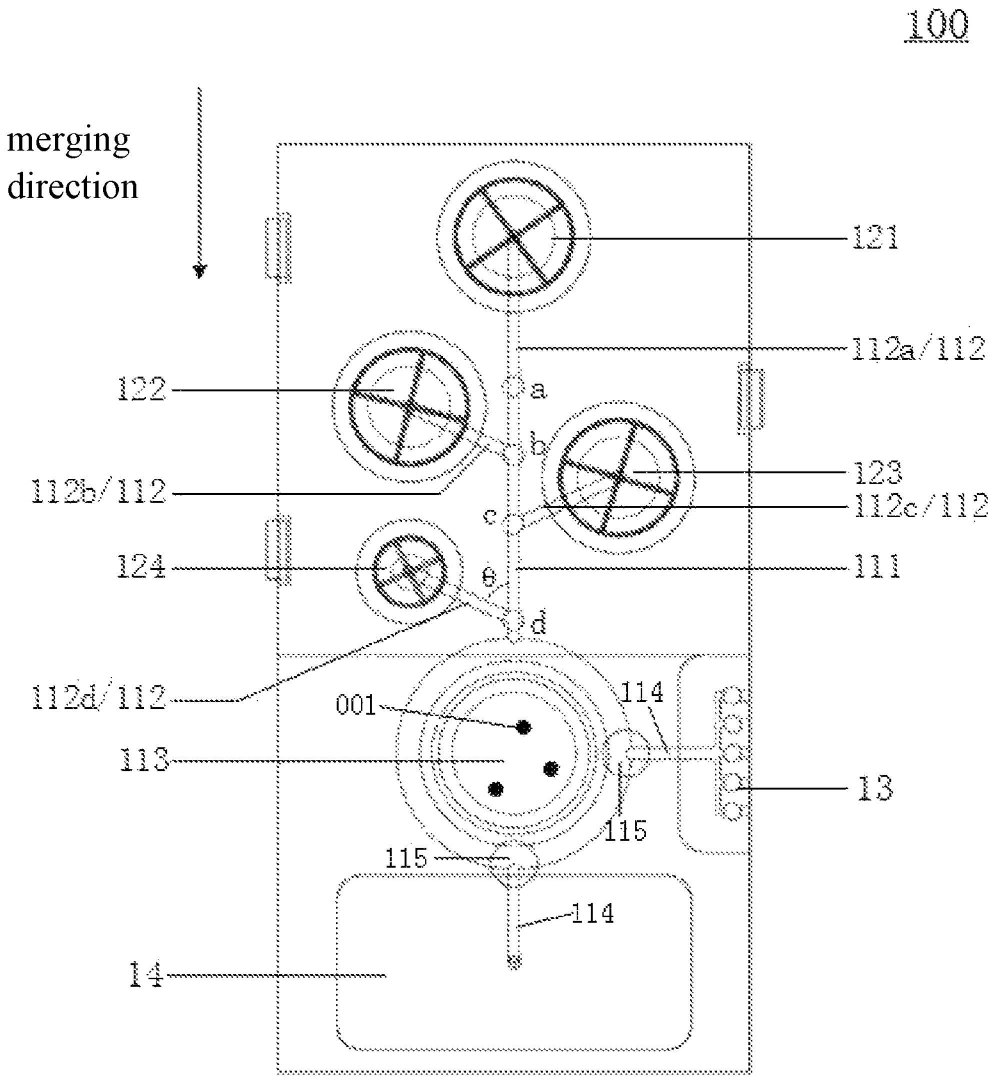
FIG. 3 is a top perspective view of the detection chip illustrated in FIG. 1.

FIG. 1 is a perspective exploded view of a three-dimensional structure of a detection chip provided by at least one embodiment of the present disclosure, FIG. 2 is a perspective view of the three-dimensional structure of the detection chip illustrated in FIG. 1, and FIG. 3 is a top perspective view of the detection chip illustrated in FIG. 1.

The detection chip provided by some embodiments of the present disclosure is described below with reference to FIGS. 1-3.

As illustrated in FIGS. 1-3, a detection chip 100 includes a chip substrate 10, and the chip substrate 10 includes a fluid channel 11 and a plurality of liquid cells 12.

For example, the fluid channel 11 is provided on a surface of the chip substrate 10, for example, on a lower surface of the chip substrate 10 illustrated in FIGS. 1-3. For example, the material of the chip substrate 10 is polypropylene (PP), and the chip substrate 10 is subjected to an injection molding process. By designing the corresponding injection mold, the fluid channel 11 can be formed in a recessed form on the lower surface of the chip substrate 10. Of course, the embodiments of the present disclosure are not limited thereto, and the fluid channel 11 can also be fabricated by any applicable process such as laser engraving, photoetching, and so on. It should be noted that in the embodiments of the present disclosure, the material and processing method of the chip substrate 10 are not limited, which can be determined as actually required.

For example, in some examples, as illustrated in FIG. 1 and FIG. 3, the plurality of liquid cells 12 includes four liquid cells, i.e., a first liquid cell 121, a second liquid cell 122, a third liquid cell 123 and a fourth liquid cell 124. The first liquid cell 121 is configured to contain a lysis solution, the second liquid cell 122 is configured to contain a first rinsing solution, the third liquid cell 123 is configured to contain a second rinsing solution, and the fourth liquid cell 124 is configured to contain eluant.

For example, as illustrated in FIG. 3, the fluid channel 11 includes a main path 111 and a plurality of branch paths 112. The plurality of branch paths 112 are respectively communicated to the plurality of liquid cells 12. For example, in some examples, the plurality of branch paths 112 include four branch paths, which are respectively a first branch path 112*a*, a second branch path 112*b*, a third branch path 112*c*, and a fourth branch path 112*d*. The first branch path 112*a* is communicated to the first liquid cell 121, the second branch path 112*b* is communicated to the second liquid cell 122, the third branch path 112*c* is communicated to the third liquid cell 123, and the fourth brand path 112*d* is communicated to the fourth liquid cell 124.

For example, the plurality of branch paths 112 are also communicated to the main path 111, and communication points between the plurality of branch paths 112 and the main path 111 are different. For example, one end of each of the plurality of branch paths 112 is communicated to one of the liquid cells 12, and the other end is communicated to the main path 111. For example, in some examples, the communication point between the first branch path 112*a* and the main path 111 is a, the communication point between the second branch path 112*b* and the main path 111 is b, the communication point between the third branch path 112*c* and the main path 111 is c, and the communication point between the fourth branch path 112*d* and the main path 111 is d, where the communication points a, b, c, and d are different, that is, the communication points a, b, c, and d are located at different positions of the main path 111. For example, the first branch path 112*a* and the main path 111 are located on a same straight line, and the first branch path 112*a* and the main path 111 can be different portions of a same flow channel. Correspondingly, the communication point a can be any point on the flow channel, as long as it does not overlap with the communication points b, c, and d.

For example, the plurality of branch paths 112 are configured to allow liquid in the plurality of branch paths 112 to be capable of merging into the main path 111 in a same direction. Here, "merging into the main path 111 in a same direction" means that the liquid can flow in the main path 111 in the same direction after merging into the main path 111. For example, as illustrated in FIG. 3, an included angle $\theta$ between the fourth branch path 112*d* and the main path 111 is an acute angle, i.e., $\theta<90°$, so the liquid in the fourth liquid cell 124 can pass through the fourth branch path 112*d* and merge into the main path 111, and can flow in the main path 111 along a merging direction illustrated in FIG. 3 after merging into the main path 111. Similarly, the included angle between the first branch path 112*a* and the main path 111, the included angle between the second branch path 112*b* and the main path 111, and the included angle between the third branch path 112*c* and the main path 111 are all acute angles (the included angle between the first branch path 112*a* and the main path 111 is, for example, 0°), so that the liquid in the first liquid cell 121, the second liquid cell 122 and the third liquid cell 123 can merge into the main path 111 through respective branch paths, and can flow in the main path 111 along the merging direction illustrated in FIG. 3, for example, under action of inertia, after merging into the main path 111.

For example, an aspect ratio of any one of the main path 111 and the branch paths 112 ranges from 0.4 to 0.6, e.g., 0.5. Here, the dimension of any one of the main path 111 and the branch paths 112 (i.e., any path among the main path 111 and the branch paths 112) in a direction perpendicular to the chip substrate 10 is referred to as a depth, the dimension of the path in a direction perpendicular to a liquid flow direction in a plane parallel to the chip substrate 10 is referred to as a width, and the above-mentioned "aspect ratio" refers to a ratio of the depth to the width of the path. In the case where the aspect ratio of any one of the main path 111 and the branch paths 112 ranges from 0.4 to 0.6, uniformity and controllability of the liquid flow are relatively good. Optionally, in the case where the aspect ratio of any one of the main path 111 and the branch paths 112 is 0.5, the uniformity and controllability of the liquid flow are better. It should be noted that, in the embodiments of the present disclosure, the aspect ratio of each path may be same or different, which is not limited in the embodiments of the present disclosure.

For example, in some examples, the widths of the main path 111 and the branch paths 112 are equal or approximately equal, so that the uniformity and controllability of the liquid flow can be improved. Of course, the embodiments of the present disclosure are not limited thereto. In some other examples, the widths of the main path 111 and the branch paths 112 may also be unequal or have large differences. This may be determined as actually required, for example, may be determined according to the distribution manner of the main path 111 and the branch paths 112, which is not limited in the embodiments of the present disclosure.

It should be noted that in the embodiments of the present disclosure, the dimensions and distribution positions of the main path 111 and the branch paths 112, and the included angles between the main path 111 and the branch paths 112 are not limited, which can be determined as actually required. It is only necessary to ensure that the liquid in the plurality of branch paths 112 can merge into the main path 111 in the same direction, and the communication points between the plurality of branch paths 112 and the main path 111 are different.

For example, as illustrated in FIG. 3, the fluid channel 11 further includes an extraction region 113, and the extraction region 113 is communicated to the main path 111. For example, the liquid contained in the plurality of liquid cells 12 can respectively merge into the main path 111 through the corresponding branch paths 112, and flow into the extraction region 113 through the main path 111, so as to facilitate extraction, rinsing, and elution in the extraction region 113. It should be noted that although the extraction region 113 illustrated in FIG. 3 is a circular recess, this does not constitute a limitation to the embodiments of the present disclosure. The extraction region 113 may also be a recess of any other applicable shape, such as a rectangle, a hexagon, an ellipse, etc., as long as a space for accommodating liquid can be formed, which is not limited in the embodiments of the present disclosure.

For example, the extraction region 113 includes a plurality of magnetic beads 001, and the plurality of magnetic beads 001 are distributed in the extraction region 113 in an activity manner. For example, surfaces of the magnetic beads 001 are modified, and when the detection chip 100 is used for detection, for example, when the detection chip 100 is used to detect specific nucleic acid fragments, the magnetic beads 001 can bind molecular structures such as nucleic acid fragments to the magnetic beads 001 during an extraction process of detection, so as to achieve an extraction function. For example, the molecular structures such as the aforementioned nucleic acid fragments are obtained after lysing a sample to be tested. Regarding description of modifying the surfaces of the magnetic beads 001, reference can be made to the conventional design, which will not be described in detail here.

In the above manner, the main path 111 and the plurality of branch paths 112 form a same direction alternate flow channel. In the case where the plurality of liquid cells 12 contain different reagents, the same direction alternate flow channel can flush a former reagent remaining at a junction of the main path 111 and the extraction region 113 when a latter reagent passes through, which can prevent more reagents from remaining at the junction of the main path 111 and the extraction region 113, so that an extracted reaction solution (for example, containing nucleic acid fragments to be detected) does not contain inhibitors, thereby facilitating subsequent effective amplification reaction of the extracted reaction solution to improve the accuracy of detection. The detection chip 100 has a simple structure and can solve the problem of residue in a shared flow channel. Moreover, when the liquid in the liquid cell 12 accidentally leaks, the same direction alternate flow channel can prevent the liquid leaked from any liquid cell 12 from entering any other liquid cell 12, so that the problem of liquid mixture of different reagents can be solved without adding a sealing valve.

For example, as illustrated in FIG. 1, in at least one embodiment of the present disclosure, the detection chip 100 may further include a sealing film 20. For example, the sealing film 20 covers the surface of the chip substrate 10 having the fluid channel 11, such as the lower surface of the chip substrate 10 illustrated in FIG. 1. Because the fluid channel 11 is provided on the lower surface of the chip substrate 10 in the form of a recess, a liquid (for example, various reagents required for analysis and detection) flow space can be formed between the sealing film 20 and the fluid channel 11, and for example, a space for reagent reaction can also be formed.

For example, the sealing film 20 is an elastic film, such as an elastic transparent film. For example, the material of the sealing film 20 is polyethylene terephthalate (PET) which has better elasticity and strength, so as to restore to an original state after elastic deformation. Of course, the embodiments of the present disclosure are not limited thereto, and the sealing film 20 may also be made of other applicable materials, such as a polymer composite material of polystyrene (PS) and PET, so as to have better elasticity and strength.

For example, as illustrated in FIG. 3, in some embodiments of the present disclosure, the fluid channel 11 further includes a plurality of flow paths 114 and a plurality of film valve parts 115, for example, includes two flow paths 114 and two film valve parts 115. For example, as illustrated in FIGS. 1-3, the chip substrate 10 further includes a reaction cell 13 and a waste liquid cell 14. The reaction cell 13 is configured to contain liquid that needs to be amplified, for example, a reaction solution after extraction, rinsing, elution, etc., and the reaction solution is amplified in the reaction cell 13 and a subsequent optical detection is performed. The waste liquid cell 14 is configured to contain waste liquid generated in the extraction region 113 during reaction. The reaction cell 13 and the waste liquid cell 14 are respectively communicated to the extraction region 113 through the plurality of flow paths 114. For example, the reaction cell 13 is communicated to the extraction region 113 through one flow path 114, and the waste liquid cell 14 is communicated to the extraction region 113 through another flow path 114. For example, the plurality of film valve parts 115 are respectively located in the plurality of flow paths 114, for example, one film valve part 115 is provided in each flow path 114.

The film valve part 115 is configured to allow a portion of the sealing film 20 covering the film valve part 115 to approach and separate, so as to correspondingly close and open the flow path 114. Therefore, the film valve part 115 can control whether the reaction cell 13 is communicated to the extraction region 113, and control whether the waste liquid cell 14 is communicated to the extraction region 113. For example, under an action (for example, squeezing) of a separately provided part, the portion of the sealing film 20 covering the film valve part 115 is squeezed and deformed, for example, elastically deformed, so as to approach the chip substrate 10 (for example, completely attached to the chip substrate 10), so that the space between the sealing film 20 and the fluid channel 11 is reduced or even cut off at the position where the film valve part 115 is located, and the liquid cannot pass through the film valve part 115, thereby correspondingly closing the flow path 114. For example, under an action (for example, loosening) of the separately provided part, the portion of the sealing film 20 covering the film valve part 115 and attached to the chip substrate 10 restores from deformation, so as to separate from the chip substrate 10, such that the space between the sealing film 20 and the fluid channel 11 is restored to be unblocked at the position where the film valve part 115 is located, and the liquid can pass through the film valve part 115, thereby correspondingly opening the flow path 114.

In these embodiments of the present disclosure, the film valve part 115 can control whether the liquid in the fluid channel 11 passes through or not, and can be used as a sealing valve for the reaction cell 13 and the waste liquid cell 14 to control when the liquid in the extraction region 113 enters the reaction cell 13 or the waste liquid cell 14. Because an amount of reagent passed by the film valve part 115 once opened is basically unchanged, the film valve part 115 can also deliver reagents quantitatively to achieve microliter-level liquid delivery.

For example, the film valve part 115 is a circular recess illustrated in FIG. 3, and accordingly, the separately provided part for controlling the film valve part 115 is a cylindrical protrusion, so that the film valve part 115 can be squeezed. Of course, the embodiments of the present disclosure are not limited thereto, and the film valve part 115 may also have any other applicable shape, such as a rectangle, a hexagon, an ellipse, etc. Correspondingly, the separately provided part for controlling the film valve part 115 may have a cross-sectional shape of a columnar protrusion such as a rectangle, a hexagon, an ellipse, etc., so that the film valve part 115 can be squeezed.

Respective dimensions of the film valve part 115 and the flow path 114 are not limited, which can be determined as actually required, and it is only necessary to ensure that the film valve part 115 can control the opening and closing of the flow path 114.

It should be noted that, in the embodiments of the present disclosure, the sealing film 20 is, for example, an elastic transparent plastic film (for example, a PET film), and the sealing film 20 has certain elasticity and strength. The portion of the sealing film 20 covering the extraction region 113 is pushed and pulled up and down after positive and negative pressure (for example, positive and negative air pressure) is applied. Therefore, in the case where the flow path 114 is not closed, the liquid can be pumped quantitatively, so as to control the liquid to flow between the extraction region 113 and the reaction cell 13, and between the extraction region 113 and the waste liquid cell 14. Because the sealing film 20 is relatively thin and can achieve rapid heat conduction, heat can be conducted quickly when the reaction solution in the reaction cell 13 is heated, which helps to improve heat conduction efficiency and speed up the amplification reaction. The sealing film 20 is a transparent film, so that when the optical detection is performed on the solution in the reaction cell 13 that completes the amplification reaction, the light transmittance is higher, which facilitates improvement of the stability and accuracy of the optical detection.

Figure 4:
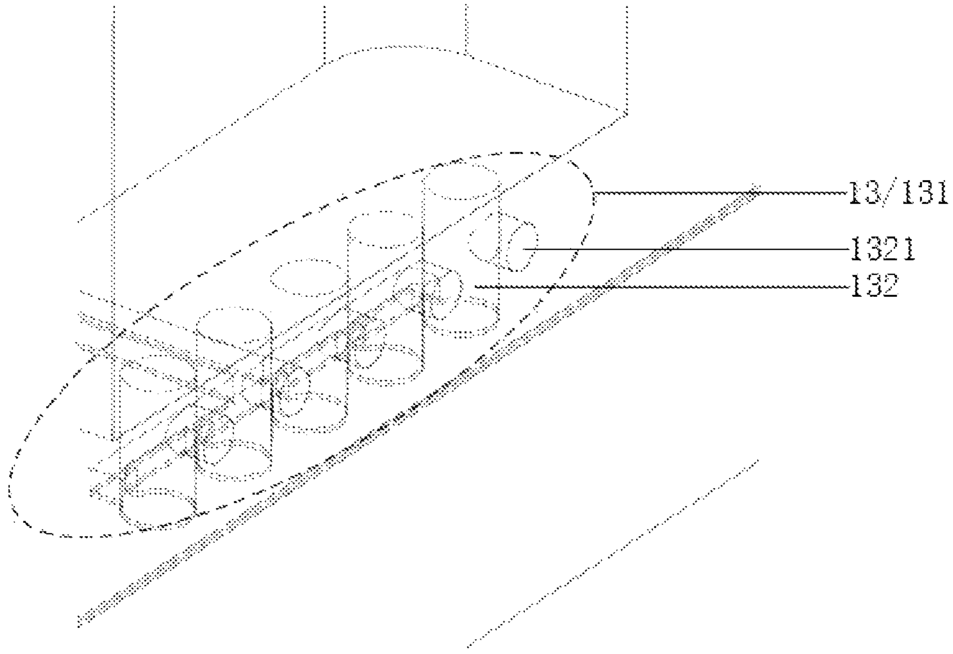
FIG. 4 is a partially enlarged perspective view of a reaction cell of a detection chip provided by at least one embodiment of the present disclosure.
Figure 5:
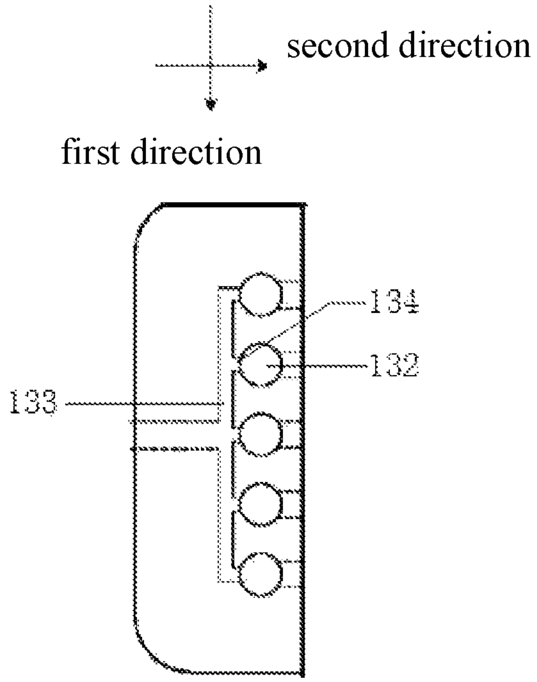
FIG. 5 is a partially enlarged top perspective view of the reaction cell of the detection chip illustrated in FIG. 4.

FIG. 4 is a partially enlarged perspective view of a reaction cell of a detection chip provided by at least one embodiment of the present disclosure, and FIG. 5 is a partially enlarged top perspective view of the reaction cell of the detection chip illustrated in FIG. 4.

For example, in some examples, as illustrated in FIG. 4 and FIG. 5, the reaction cell 13 includes a porous structure 131, the porous structure 131 includes a plurality of pore-shaped parts 132, and the plurality of pore-shaped parts 132 are configured to contain same or different amplifications primers. For example, the amplification primers are lyophilized reagents, and the reaction solution entering the reaction cell 13 can re-thaw the lyophilized reagents, and the desired reaction (such as an amplification reaction) occurs, so that the optical detection can be performed after the reaction is completed. In the case where the plurality of pore-shaped parts 132 contain different amplification primers, the reaction solution entering respective pore-shaped part 132 may undergo different amplification reactions (that is, amplified objects are different), so that a plurality of objects (for example, different types of viruses) can be detected to achieve multiple detections. Because the amplification primers are lyophilized reagents, the amplification primers contained in each pore-shaped part 132 may not be mixed during delivery, and may not move out of the pore-shaped part 132.

It should be noted that in the embodiments of the present disclosure, the shape, dimension, and number of the pore-shaped parts 132 are not limited, which can be determined as actually required. For example, the pore-shaped part 132 can be a vertical hole with a cross-sectional shape of any shape such as a circle, a rectangle, a square, a hexagon, etc., and the number of the pore-shaped part 132 can be 5, 6, or any other value. The cross-sectional dimension and pore depth of the pore-shaped part 132 can also be determined according to the amount of liquid to be contained, which is not limited in the embodiments of the present disclosure.

For example, in some examples, as illustrated in FIG. 4 and FIG. 5, the porous structure 131 further includes a connecting channel 133 and a plurality of connecting byroads 134. The plurality of connecting byroads 134 are all communicated to the connecting channel 133, and an extending direction of the connecting byroad 134 is perpendicular to an extending direction of the connecting channel 133. For example, the connecting channel 133 extends along a first direction, and the connecting byroad 134 extends along a second direction, and the first direction is perpendicular to the second direction. The plurality of pore-shaped parts 132 are respectively communicated to the plurality of connecting byroads 134, and the plurality of pore-shaped parts 132 are arranged in a row along a direction parallel to the extending direction of the connecting channel 133, that is, arranged in a row along the first direction.

In the above manner, the porous structure 131 constitutes a rake structure, so that the reaction solution can evenly flow into each pore-shaped part 132, and the amplification primers in respective pore-shaped part 132 do not affect each other. The porous structure 131 can achieve multiple detection.

It should be noted that, in the embodiments of the present disclosure, the extending direction of the connecting channel 133 and the extending direction of the connecting byroad 134 may be completely or approximately perpendicular, and the extending directions of the plurality of connecting byroads 134 may be completely or approximately same, which can be determined according to design requirements and manufacturing process, and is not limited in the embodiments of the present disclosure.

For example, in some examples, as illustrated in FIG. 4, the pore-shaped part 132 includes an air-permeable hole 1321, and the air-permeable hole 1321 is covered with an air-permeable and liquid-impermeable film. When the reaction solution flows into the pore-shaped part 132, intensity pressure in the pore-shaped part 132 increases, and the air-permeable hole 1321 can exhaust excess air in the pore-shaped part 132 to balance the air pressure, thereby facilitating the reaction solution entering the pore-shaped part 132 from the extraction region 113. The air-permeable and liquid-impermeable film has a function of air-permeability but liquid-impermeability, thereby preventing the reaction solution from flowing out of the pore-shaped part 132. For example, the air-permeable and liquid-impermeable film may be an expanded polytetrafluoroethylene (ePTFE) air-permeable and liquid-impermeable film, which is not limited in the embodiments of the present disclosure.

The air-permeable hole 1321 can be formed on a side surface of the chip substrate 10 (the side surface of the chip substrate 10 illustrated in FIG. 2 or FIG. 4), the air-permeable hole 1321 is, for example, a lateral hole, and the air-permeable and liquid-impermeable film can be adhered to the side surface of the chip substrate 10, so as to cover the air-permeable hole 1321. For example, in some examples, the air-permeable and liquid-impermeable film of the plurality of air-permeable holes 1321 is of an integral structure. In this case, the air-permeable and liquid-impermeable film of the integral structure can cover, as an entire surface, one side of the chip substrate 10 having the air-permeable holes 1321, so as to simplify the structure and lower the fabrication difficulty of the detection chip 100.

Figure 6:
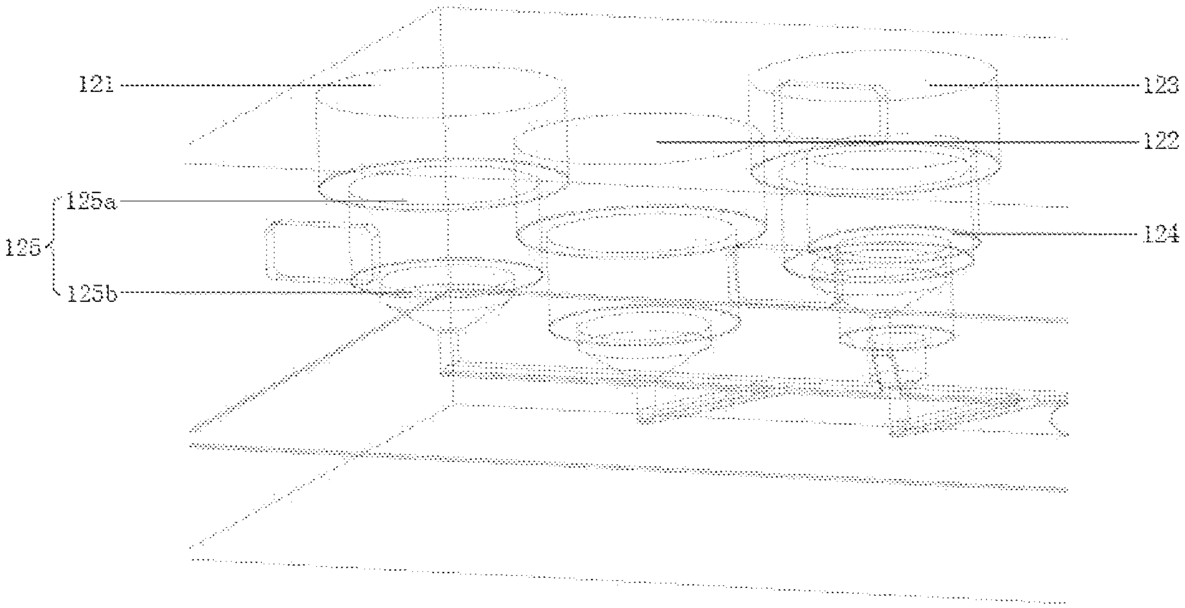
FIG. 6 is a partially enlarged perspective view of a liquid cell of a detection chip provided by at least one embodiment of the present disclosure.

FIG. 6 is a partially enlarged perspective view of a liquid cell of a detection chip provided by at least one embodiment of the present disclosure.

As illustrated in FIG. 6, the liquid cell 12 (for example, the first liquid cell 121) includes a double-layer film sealing structure 125, and the double-layer film sealing structure 125 includes two layers of liquid sealing films, such as a first liquid sealing film 125*a* and a second liquid sealing film 125*b*. The two layers of liquid sealing films 125*a* and 125*b* are stacked in a direction perpendicular to the chip substrate 10 and have a spacing. The two layers of liquid sealing films 125*a* and 125*b* define an enclosed space in the liquid cell 12 (for example, the first liquid cell 121).

For example, a reagent (for example, a lysate) used for detection is sealed in the enclosed space defined by the liquid sealing films 125*a* and 125*b* in the first liquid cell 121. Similarly, the second liquid cell 122, the third liquid cell 123, and the fourth liquid cell 124 also include a double-layer film sealing structure. For example, the first rinsing solution is sealed in the second liquid cell 122 by the double-layer film sealing structure in the second liquid cell 122, the second rinsing solution is sealed in the third liquid cell 123 by the double-layer film sealing structure in the third liquid cell 123, and the eluent is sealed in the fourth liquid cell 124 by the double-layer film sealing structure in the fourth liquid cell 124. As a result, the liquid in the liquid cell 12 can be prevented from leaking during delivery, and the problem of liquid mixture of different reagents can be solved without adding a sealing valve.

For example, at least one of the two layers of liquid sealing films 125*a* and 125*b* is a composite film including a laminated metal foil and a polymer material. For example, in some examples, each of the two layers of liquid sealing films 125*a* and 125*b* is a composite film of aluminum foil and a polymer material, so that it not only can be easily combined with the chip substrate 10 by thermal compression, but also can be easily pierced when it needs to be pierced. It should be noted that in the embodiments of the present disclosure, the method of combining the liquid sealing films 125*a* and 125*b* and the chip substrate 10 is not limited, and any applicable process methods such as thermal compression, UV adhesive bonding, double-sided adhesive bonding, etc. can be used to combine the liquid sealing films 125*a* and 125*b* and the chip substrate 10.

For example, as illustrated in FIG. 1 and FIG. 2, in at least one embodiment of the present disclosure, the detection chip 100 may further include a piercing mechanism 30 and a piercing mechanism limit plate 40. The piercing mechanism 30 includes a plurality of columnar parts 31, for example, a first columnar part 311, a second columnar part 312, a third columnar part 313, and a fourth columnar part 314. The piercing mechanism limit plate 40 is arranged on a side of the chip substrate 10 away from the fluid channel 11, for example, located above the chip substrate 10 illustrated in FIG. 1 and FIG. 2. A material of the piercing mechanism limit plate 40 may be acrylonitrile-butadiene-styrene (ABS) plastic, or any other applicable material, which is not limited in the embodiments of the present disclosure. For example, the piercing mechanism limit plate 40 may be fixed on the chip substrate 10 by a fixing method such as a snap connection or a screw connection, which is not limited in the embodiments of the present disclosure.

For example, the piercing mechanism limit plate 40 includes a plurality of openings 41 corresponding to the plurality of columnar parts 31. For example, the plurality of openings 41 include a first opening 411 corresponding to the first columnar part 311, a second opening 412 corresponding to the second columnar part 312, a third opening 413 corresponding to the third columnar part 313, and a fourth opening 414 corresponding to the fourth columnar part 314. For example, the plurality of columnar parts 31 are arranged in the plurality of openings 41. For example, the first columnar part 311 is disposed in the first opening 411, the second columnar part 312 is disposed in the second opening 412, the third columnar part 313 is disposed in the third opening 413, and the fourth columnar part 314 is disposed in the fourth opening 414.

Figure 7:
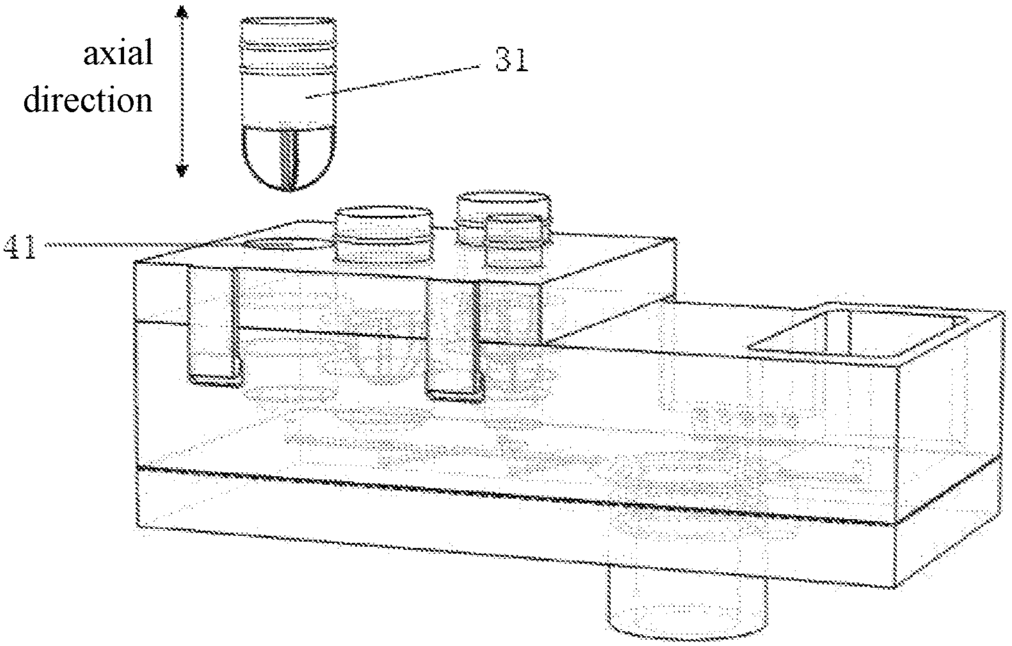
FIG. 7 is a perspective view of a three-dimensional structure of a detection chip provided by at least one embodiment of the present disclosure.

For example, as illustrated in FIG. 7, the columnar part 31 can move in the corresponding opening 41 along an axial direction of the opening 41. The columnar part 31 is configured to not only pierce the double-layer film sealing structure in the liquid cell 12, but also seal the liquid cell 12. For example, the columnar part 31 can also be used to push the liquid in the liquid cell 12 into the fluid channel 11, that is, it has a liquid injection function. In this way, the amount of reagent entering the fluid channel 11 can be precisely controlled.

Figure 8:
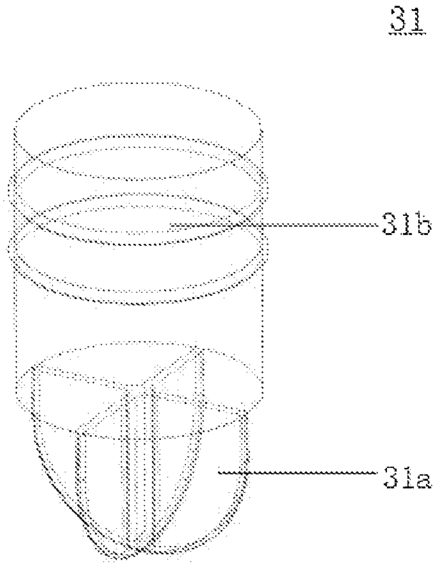
FIG. 8 is a perspective view of a three-dimensional structure of a columnar part of a detection chip provided by at least one embodiment of the present disclosure.

For example, as illustrated in FIG. 8, the columnar part 31 may be of a structure with two ends asymmetrical, where one end (for example, a first end 31*a*) is of an approximately cone-shaped structure, and the other end (for example, a second end 31*b*) is of an approximately columnar structure. The end (for example, the first end 31*a*) of the columnar part 31 close to the chip substrate 10 is made of a rigid material, such as polycarbonate (PC), polymethyl methacrylate (PMMA), or a rigid resin; and the end (for example, the second end 31*b*) of the columnar part 31 away from the chip substrate 10 is made of an elastic material, such as rubber.

For example, the columnar part 31 may be manufactured by two-color injection molding or any other applicable process, which is not limited in the embodiments of the present disclosure.

As the detection chip 100 is used, when the columnar part 31 moves along the axial direction of the opening 41 toward a direction of the chip substrate 10 under the control of a separately provided control device, because the first end 31*a* of the columnar part 31 has high hardness and is relatively sharp, it can pierce one or two layers of the liquid sealing films of the double-layer film sealing structure. In the case where only one layer of the liquid sealing films is pierced, a sample solution can be added to the liquid cell 12 through a broken opening on the liquid sealing film; in the case where two layers of the liquid sealing films are both pierced, the liquid in the liquid cell 12 can flow into the extraction region 113 through the aforementioned same direction alternate flow channel, under action of gravity and push of the columnar part 31. In addition, the second end 31*b* of the columnar part 31 is soft and elastic, and can function as an O-ring seal, thereby sealing the liquid cell 12 after the double-layer film sealing structure is pierced, so as to prevent the liquid in the liquid cell 12 from leaking.

For example, as illustrated in FIG. 7, one end of the liquid cell 12 communicating to the branch path 112 is cone-shaped (also refer to FIG. 6). Because the first end 31*a* of the columnar part 31 has an approximately cone-shaped structure, the columnar part 31 can better fit the inner wall of the liquid cell 12 so as to push the liquid in the liquid cell 12 into the branch path 112, so as to prevent the liquid from remaining in the liquid cell 12 and save the reagents.

It should be noted that, in the embodiments of the present disclosure, the plurality of columnar parts 31 can independently move under the control of a separately provided control device, so that the double-layer film sealing structure in any one or a plurality of the liquid cells 12 can be respectively pierced, so as to allow the liquid in the plurality of liquid cells 12 to respectively flow into the extraction region 113 in a certain order as required. A cross-sectional shape of the columnar part 31 is same as or similar to a cross-sectional shape of the corresponding opening 41, a cross-sectional dimension of the first end 31*a* of the columnar part 31 is slightly smaller than a cross-sectional dimension of the corresponding opening 41, and a cross-sectional dimension of the second end 31*b* of the columnar part 31 is slightly larger than a cross-sectional dimension of the corresponding opening 41, so that the columnar part 31 can move in an approximately vertical direction in the opening 41, and a better effect of liquid sealing can be achieved.

For example, as illustrated in FIG. 1, in at least one embodiment of the present disclosure, the detection chip 100 may further include an adhesive layer 50. The adhesive layer 50 is arranged between the chip substrate 10 and the sealing film 20, and is configured to adhere the chip substrate 10 to the sealing film 20. For example, the adhesive layer 50 may include an adhesive material such as an acrylic adhesive, and may be implemented, for example, as a double-sided tape. For example, the chip substrate 10, the adhesive layer 50 and the sealing film 20 have a substantially same contour, so the adhesive layer 50 can achieve a stronger bond between the chip substrate 10 and the sealing film 20.

For example, the adhesive layer 50 exposes the fluid channel 11 of the chip substrate 10, that is, the adhesive layer 50 includes a hollow region 51, and a shape of the hollow region 51 is same as or substantially same as an orthogonal projection of the fluid channel 11 on the adhesive layer 50, so as to facilitate the sealing film 20 and the fluid channel 11 forming a space for liquid flow and reagent reaction.

For example, in other examples, in the case where the sealing film 20 is bonded to the chip substrate 10 by ultrasonic welding, photosensitive adhesive bonding, chemical solvent bonding, or laser welding, the adhesive layer 50 may be omitted.

For example, when the detection chip 100 is used, a film valve sealing plate 002 separately provided can be closely attached to the sealing film 20, and a separately provided protruding structure is inserted correspondingly into each film valve part 115 through a through hole of the film valve sealing plate 002. Therefore, in the case where each protruding structure and each film value part 115 are in contact with each other, the portion of the sealing film 20 covering the film valve part 115 is squeezed and deformed to completely adhere to the chip substrate 10, thereby closing the flow path 114.

For another example, when the detection chip 100 is used, a piston 003 separately provided can pass through the through hole of the film valve sealing plate 002 and contact the sealing film 20. Through reciprocating movement of the piston 003, the portion of the sealing film 20 covering the extraction region 113 vibrates repeatedly, so that the liquid in the extraction region 113 vibrates, which facilitates better operations such as extraction, rinsing, elution, etc. For example, in some examples, a movable magnet (such as a permanent magnet or an electromagnet) is embedded in the piston 003, and the magnet can extend or retract into the piston 003, so as to generate attractive force to the magnetic beads 001 in the extraction region 113 as needed during the detection process.

The working principle of the detection chip 100 is exemplified below.

In the fabrication process, the lysis solution is embedded in the first liquid cell 121, the first rinsing solution is embedded in the second liquid cell 122, the second rinsing solution is embedded in the third liquid cell 123, and the eluate is embedded in the fourth liquid cell 124. The liquid in each liquid cell 12 is sealed by a double-layer film sealing structure. Amplification primers are embedded in the pore-shaped parts 132 of the reaction cell 13. For example, taking it as an example that human papillomavirus is the sample to be tested, the lysis solution is a mixture of guanidine hydrochloride, 3-(N-morpholine) propanesulfonic acid (MOPS), polyoxyethylene sorbitan monolaurate and polyoxyethylene bis-sorbitan monolaurate (Tween); the first rinsing solution is composed of guanidine hydrochloride, MOPS and isopropanol; the second rinsing solution is composed of guanidine hydrochloride, MOPS and ethanol; and the eluent is composed of tris and ethylenediaminetetraacetic acid (EDTA).

When used, the detection chip 100 is installed on a separately provided detection apparatus. For example, the detection apparatus includes a piercing mechanism control unit, and the piercing mechanism control unit can control the piercing mechanism 30 of the detection chip 100 to pierce the double-layer film sealing structure of each liquid cell 12. For example, the detection apparatus may further include a film valve sealing plate 002, a piston 003 and a plurality of protruding structures. The film valve sealing plate 002 adheres to the sealing film 20. The plurality of protruding structures correspond to the plurality of film valve parts 115 one by one, and can individually control each film valve part 115. The piston 003 passes through the through hole of the film valve sealing plate 002 and contacts the sealing film 20.

First, the first columnar part 311 is controlled to move downward along the axial direction of the first opening 411, and pierce the first liquid sealing film 125*a* of the first liquid cell 121. The first columnar part 311 is controlled to move upward along the axial direction of the first opening 411 to expose the broken opening of the first liquid sealing film 125*a*. The sample to be tested is added to the first liquid cell 121. The sample to be tested is, for example, blood, body fluid, etc., which is not limited in the embodiments of the present disclosure. The sample to be tested is lysed under the action of the lysis solution in the first liquid cell 121 (the lysis temperature range may be determined as actually required, for example), thereby lysing to obtain nucleic acid fragments. The first columnar part 311 is controlled to move downward again along the axial direction of the first opening 411, and pierce the second liquid sealing film 125*b* of the first liquid cell 121. Under action of gravity and push of the first columnar part 311, the liquid in the first liquid cell 121 flows into the extraction region 113 through the same direction alternate flow channel. At this time, the two film valve parts 115 are in a closed state by using the protruding structure. Next, the piston 003 is made to perform high-frequency reciprocating movement, to cause the portion of the sealing film 20 covering the extraction region 113 vibrates repeatedly, so that the liquid in the extraction region 113 vibrates, so as to facilitate the magnetic beads 001 embedded in the extraction region 113 being combined with the nucleic acid fragments in the liquid to implement extraction of the nucleic acid fragments.

Then, the second columnar part 312 is controlled to move downward along the axial direction of the second opening 412 and pierce the double-layer film sealing structure of the second liquid cell 122 (for example, both layers of liquid sealing films are pierced). Under action of gravity and push of the second columnar part 312, the liquid in the second liquid cell 122 flows into the extraction region 113 through the same direction alternate flow channel. At this time, the lysis solution remaining at a junction of the main path 111 and the extraction region 113 is flushed by the first rinsing solution in the second liquid cell 122 into the extraction region 113. Next, the piston 003 is made to perform high-frequency reciprocating movement, to cause the portion of the sealing film 20 covering the extraction region 113 vibrates repeatedly, so that the liquid in the extraction region 113 vibrates, to further flush away impurities. Then, the film valve part 115 corresponding to the waste liquid cell 14 is opened, and the magnet embedded in the piston 003 is used to attract the magnetic beads 001 in the extraction region 113 (for example, the magnet extends out of the piston 003 to approach the sealing film 20 to cover the portion of the sealing film 20 covering the extraction region 113). The detection apparatus is used to apply low-frequency positive and negative air pressure to the portion of the sealing film 20 covering the extraction region 113 (alternatively, only negative air pressure or only positive air pressure may be applied depending on the actual situation), so as to inject the liquid in the extraction region 113 into the waste liquid cell 14. At this time, because the magnetic beads 001 are fixed in the extraction region 113 under the attractive force of the magnet, the nucleic acid fragments adsorbed on the magnetic beads 001 cannot enter the waste liquid cell 14 along with the liquid. Then, the film valve part 115 corresponding to the waste liquid cell 14 is closed, and the magnet is retracted into the piston 003 to make the magnetic beads 001 movable.

Then, the third columnar part 313 is controlled to move downward along the axial direction of the third opening 413, and pierce the double-layer film sealing structure of the third liquid cell 123 (for example, both layers of liquid sealing films are pierced). Under action of gravity and push of the third columnar part 313, the liquid in the third liquid cell 123 flows into the extraction region 113 through the same direction alternate flow channel. At this time, the first rinsing solution remaining at a junction of the main path 111 and the extraction region 113 is flushed by the second rinsing solution in the third liquid cell 123 into the extraction region 113. Next, the piston 003 is made to perform high-frequency reciprocating movement, to cause the portion of the sealing film 20 covering the extraction region 113 vibrates repeatedly, so that the liquid in the extraction region 113 vibrates, to further flush away salt ions and some small molecules. Then, the film valve part 115 corresponding to the waste liquid cell 14 is opened, and the magnet embedded in the piston 003 is used to attract the magnetic beads 001 in the extraction region 113. The air pressure is applied to the portion of the sealing film 20 covering the extraction region 113 in a manner of applying air pressure, so as to inject the liquid in the extraction region 113 into the waste liquid cell 14. Then, the film valve part 115 corresponding to the waste liquid cell 14 is closed, and the magnet is retracted into the piston 003 to make the magnetic beads 001 movable.

Then, the fourth columnar part 314 is controlled to move downward along the axial direction of the fourth opening 414, and pierce the double-layer film sealing structure of the fourth liquid cell 124 (for example, both layers of liquid sealing films are pierced). Under action of gravity and push of the fourth columnar part 314, the liquid in the fourth liquid cell 124 flows into the extraction region 113 through the same direction alternate flow channel. At this time, the second rinsing solution remaining at a junction between the main path 111 and the extraction region 113 is flushed by the eluent in the fourth liquid cell 124 into the extraction region 113. The nucleic acid fragments adsorbed on the magnetic beads 001 are resolved and eluted by the eluent, and separated from the magnetic beads 001. Next, the film valve part 115 corresponding to the reaction cell 13 is opened, the air pressure is applied to the portion of the sealing film 20 covering the extraction region 113 by the above-mentioned pressure application method, and the liquid containing the eluted nucleic acid fragments is injected into the reaction cell 13. In the process of injecting the liquid into the reaction cell 13, the magnet embedded in the piston 003 is used to attract the magnetic beads 001 in the extraction region 113 to prevent the magnetic beads 001 from entering the reaction cell 13. Then, the film valve part 115 corresponding to the reaction cell 13 is closed.

Finally, the film valve part 115 corresponding to the waste liquid cell 14 is opened, and the magnet is retracted into the piston 003, so that the magnetic beads 001 can move, and are injected into the waste liquid cell 14 along with the waste liquid. The amplification primers embedded in the pore-shaped part 132 of the reaction cell 13 are resolved by the solution entering the pore-shaped part 132. A temperature control unit in the detection apparatus is used to control the temperature of the pore-shaped part 132, so that the nucleic acid fragments in the pore-shaped part 132 are amplified at a constant temperature or polymerase chain reaction (PCR) is performed, and then, the amplification product are analyzed and detected by an optical detection unit of the detection apparatus, thereby completing the detection and obtaining a detection result. In the case where the amplification primers embedded in the plurality of pore-shaped parts 132 are different, multiple detection can be implemented.

It should be noted that, in some examples, in the operation process, the detection apparatus may also be used to apply high-frequency positive and negative air pressure to the portion of the sealing film 20 covering the extraction region 113, to cause the portion of the sealing film 20 covering the extraction region 113 vibrates repeatedly, so that the liquid in the extraction region 113 vibrates, which facilitates better operations such as extraction, rinsing, elution, etc. In this case, the piston 003 can be omitted to simplify the structure of the detection apparatus, and a separate magnet is required. For example, in some other examples, during the operation, the piston 003 can also be used to squeeze upwards, so that the liquid in the extraction region 113 enters the reaction cell 13 or the waste liquid cell 14, so that there is no need to apply air pressure to the portion of the sealing film 20 covering the extraction region 113, which simplifies the operation.

Through the above steps, the detection chip 100 can be used to implement the analysis and detection of the sample to be detected. The detection chip 100 has a simple structure and a simple fabrication process, can improve product yield, reduce production costs, can quantitatively deliver reagents, can implement multiple detections, and can solve the problem of liquid mixture of different reagents and the problem of residue in the shared flow channel without adding a sealing valve, and helps to improve the heat transfer efficiency and the stability and accuracy of optical detection. In addition, because the first and second rinsing solutions contain amplification reaction inhibitors, the first rinsing solution and the second rinsing solution remaining at the junction of the main path 111 and the extraction region 113 can be rinsed through the above steps, so that the extracted reaction solution (for example, containing nucleic acid fragments to be detected) does not contain inhibitors, thereby facilitating effective amplification reaction of the extracted reaction solution, so as to improve the accuracy of detection.

At least one embodiment of the present disclosure further provides a detection apparatus, which is adapted to operate the detection chip according to any embodiment of the present disclosure. The detection apparatus operates the aforementioned detection chip, and can solve the problem of liquid mixture of different reagents and the problem of residue in the shared flow channel without adding a sealing valve.

Figure 9:
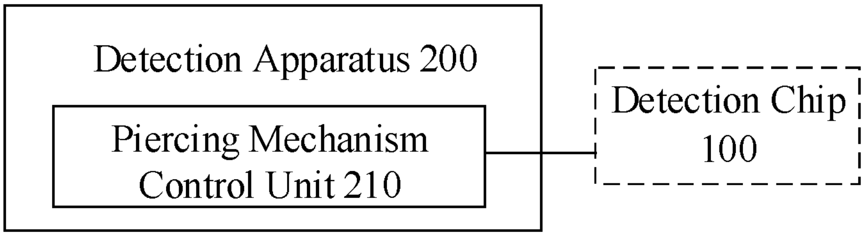
FIG. 9 is a schematic block diagram of a detection apparatus provided by at least one embodiment of the present disclosure.

FIG. 9 is a schematic block diagram of a detection apparatus provided by at least one embodiment of the present disclosure. For example, as illustrated in FIG. 9, a detection apparatus 200 is adapted to operate the aforementioned detection chip 100, and the detection apparatus 200 includes a piercing mechanism control unit 210.

For example, the piercing mechanism control unit 210 may install the detection chip 100. In the case where the detection chip 100 includes a piercing mechanism 30, the liquid cell 12 includes a double-layer film sealing structure, and the fluid channel 11 includes an extraction region 113, the piercing mechanism control unit 210 is configured to control the piercing mechanism 30 to pierce the double-layer film sealing structure in the case where the detection chip 100 is installed in the piercing mechanism control unit 210, so that the liquid in the plurality of liquid cells 12 flows into the extraction region 113 through the main path 111. For example, the piercing mechanism control unit 210 can independently control the movement of each columnar part 31, so that the double-layer film sealing structure of one or a plurality of liquid cells 12 can be pierced, so as to allow the liquid in the liquid cell 12 to flow into the extraction region 113 through the same direction alternate flow channel.

Figure 10:
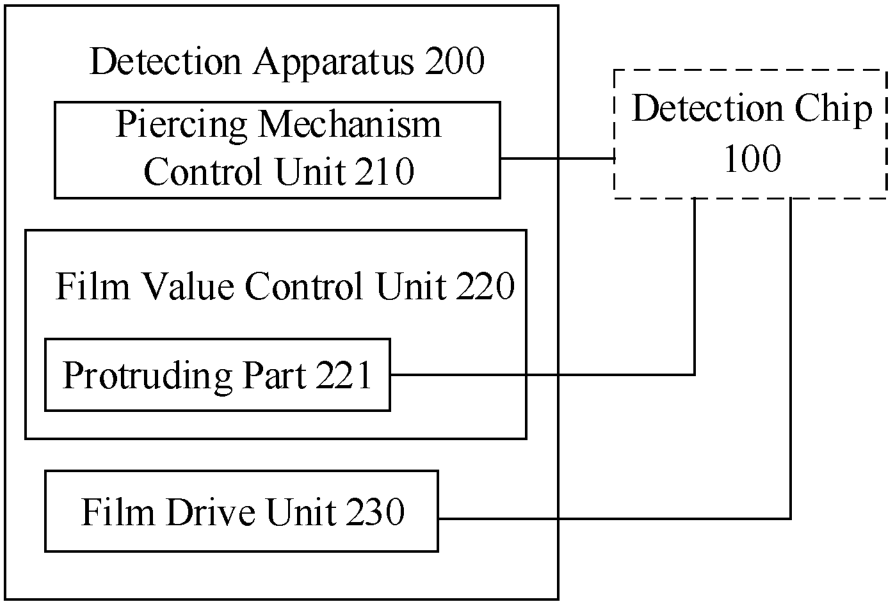
FIG. 10 is a schematic block diagram of another detection apparatus provided by at least one embodiment of the present disclosure.

FIG. 10 is a schematic block diagram of another detection apparatus provided by at least one embodiment of the present disclosure. For example, as illustrated in FIG. 10, the detection apparatus 200 provided in this embodiment is basically same as the detection apparatus 200 illustrated in FIG. 9 except that it further includes a film valve control unit 220 and a film drive unit 230. In this embodiment, in the case where the detection chip 100 further includes a sealing film 20, the fluid channel 11 further includes a film valve part 115 and a flow path 114, and the chip substrate 10 includes a reaction cell 13, the film valve control unit 220 includes at least one protruding part 221, and the at least one protruding part 221 is movable to control whether the portion of the sealing film 20 covering the film valve part 115 approaches the film valve part 115 or separate from the film valve part 115 in the case where the detection chip 100 is installed in the piercing mechanism control unit 210, so as to correspondingly close and open the flow path 114. For example, the film drive unit 230 is configured to apply pressure (for example, air pressure) to the portion of the sealing film 20 covering the extraction region 113 in the case where the detection chip 100 is installed in the piercing mechanism control unit 210, so that the portion of the sealing film 20 covering the extraction region 113 is deformed, so as to control the liquid to flow between the extraction region 113 and the reaction cell 13 and between the extraction region 113 and the waste liquid cell 14.

Figure 11:
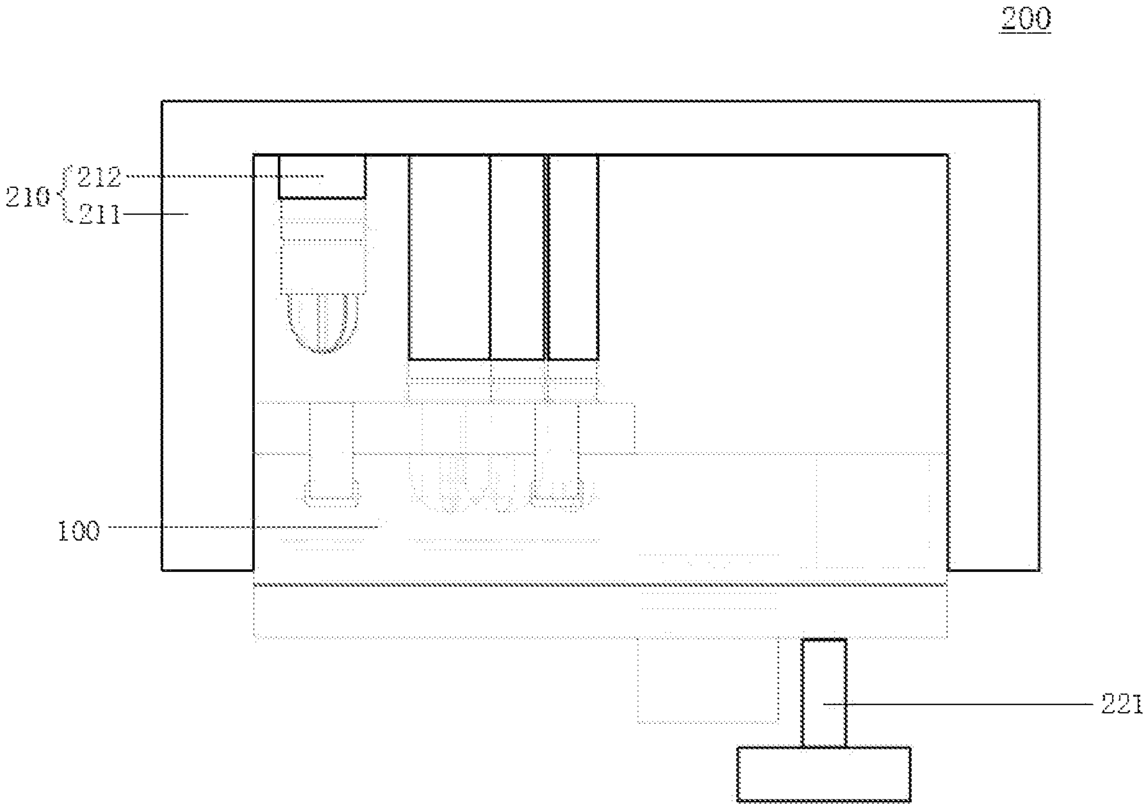
FIG. 11 is a schematic structural diagram of still another detection apparatus provided by at least one embodiment of the present disclosure.

FIG. 11 is a schematic structural diagram of still another detection apparatus provided by at least one embodiment of the present disclosure. The detection apparatus 200 provided in this embodiment is, for example, basically same as the detection apparatus 200 illustrated in FIG. 10. For example, the piercing mechanism control unit 210 includes a main body part 211 and at least one moving part 212 provided on the main body part 211. The main body part 211 has a fixed structure for accommodating the detection chip 100, and the detection chip 100 is fixed, for example, by means of snapping, bonding, or the like. At least one moving part 212 is movable (for example, protruding or retracting with respect to the main body part 211) to control the plurality of columnar parts 31 to move downwards to pierce the double-layer film sealing structure, or move upwards to expose the broken opening of the liquid sealing film, so as to allow the liquid in the liquid cell 12 to flow into the same direction alternate fluid channel, or facilitate adding the sample to be tested to the liquid cell 12.

For example, the moving part 212 may be a cylinder with a slot, and the columnar part 31 can be installed in the slot, so that the columnar part 31 and the moving part 212 can be combined, so as to control movement of the columnar part 31 by using the moving part 212. For example, the moving part 212 may be driven by pneumatic, hydraulic, etc., or the moving part 212 may be driven by a stepping motor, and these parts for driving are, for example, arranged in the main body part 211 of the piercing mechanism control unit 210.

For example, as illustrated in FIG. 11, in the detection apparatus 200, at least one protruding part 221 included in the film valve control unit 220 is movable to control whether the portion of the sealing film 20 covering the film valve part 115 approaches the film valve part 115, or separates from the film valve part 115, so as to correspondingly close and open the flow path 114. For example, the protruding part 221 may be driven by pneumatic, hydraulic, etc., or the protruding part 221 may be driven by a stepping motor, and these parts for driving are, for example, arranged in the film valve control unit 220.

It should be noted that, in the embodiments of the present disclosure, as described above, the specific implementation mode of the piercing mechanism control unit 210 is not limited. For example, it may be a hydraulic device, a propulsion control mechanism (such as a control circuit or a control chip), a combination of a cylinder with a slot (serving as the moving part 212) and a limit mechanism, or may be a combination of a motor, a propulsion control mechanism, a cylinder with a slot, and a limit mechanism, or any other implementation mode, which can be determined as actually required. Similarly, the film valve control unit 220 can also adopt the above-mentioned similar structure, and it is only necessary to replace the cylinder having a slot with a cylinder without a slot, which is used as the protruding part 221. The film drive unit 230 may be, for example, a combination of an air pressure control device, an air compressor, and a gas delivery pipe (or gas path plate), or may be any other implementation mode, which can be determined as actually required, and is not limited in the embodiments of the present disclosure.

It should be noted that, in the embodiments of the present disclosure, the detection apparatus 200 may further include more components and units, and is not limited to the piercing mechanism control unit 210, the film valve control unit 220, and the film drive unit 230 described above. For example, the detection apparatus 200 may also include a power supply, a central processing unit (CPU), an optical detection unit, a temperature control unit, etc., so that the detection apparatus 200 has more complete and richer functions. For detailed description and technical effects of the detection apparatus 200, reference may be made to the above description of the detection chip 100, which will not be repeated here.

At least one embodiment of the present disclosure further provides a method for using the detection chip, by which the detection chip described in any embodiment of the present disclosure can be operated. By using this method, the problem of liquid mixture of different reagents and the problem of residue in the shared flow channel can be solved without adding a sealing valve.

Figure 12:
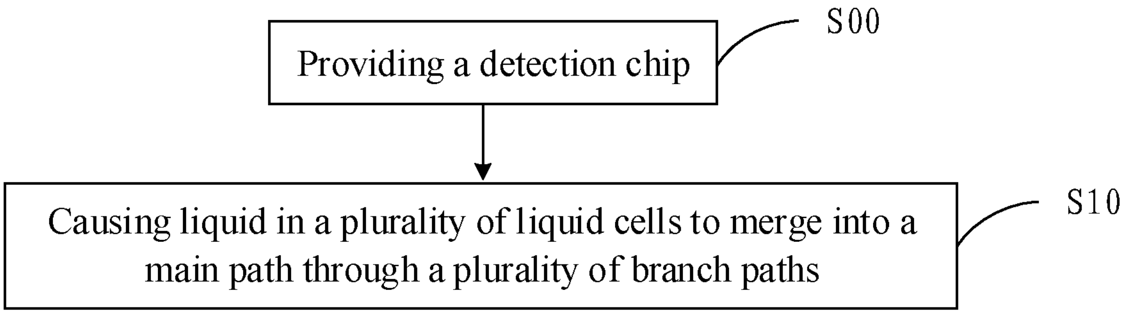
FIG. 12 is a schematic flowchart of a method for using a detection chip provided by at least one embodiment of the present disclosure.

FIG. 12 is a schematic flowchart of a method for using a detection chip provided by at least one embodiment of the present disclosure.

For example, as illustrated in FIG. 12, in some examples, the method includes operations below.

Step S00: providing a detection chip 100; and

Step S10: causing liquid in a plurality of liquid cells 12 to merge into a main path 111 through a plurality of branch paths 112.

For example, in the case where the detection chip 100 includes a piercing mechanism 30, the liquid cell 12 includes a double-layer film sealing structure, and the fluid channel 11 includes an extraction region 113, the above step S10 may further include: controlling the piercing mechanism 30 to pierce the double-layer film sealing structure, so that the liquid in the plurality of liquid cells 12 flows into the extraction region 113 through the main path 111. For example, the above-mentioned piercing mechanism control unit 210 can be used to control the columnar part 31 to pierce the double-layer film sealing structure of the liquid cell 12, so that the liquid in the liquid cell 12 merges into the main path 111 through the branch paths 112. For example, the double-layer film sealing structures of the plurality of liquid cells 12 can be pierced in sequence, so that the liquid in the plurality of liquid cells 12 merges into the main path 111 in a certain order, and further flows into the extraction region 113 to implement functions such as extraction, rinsing, and elution.

Figure 13:
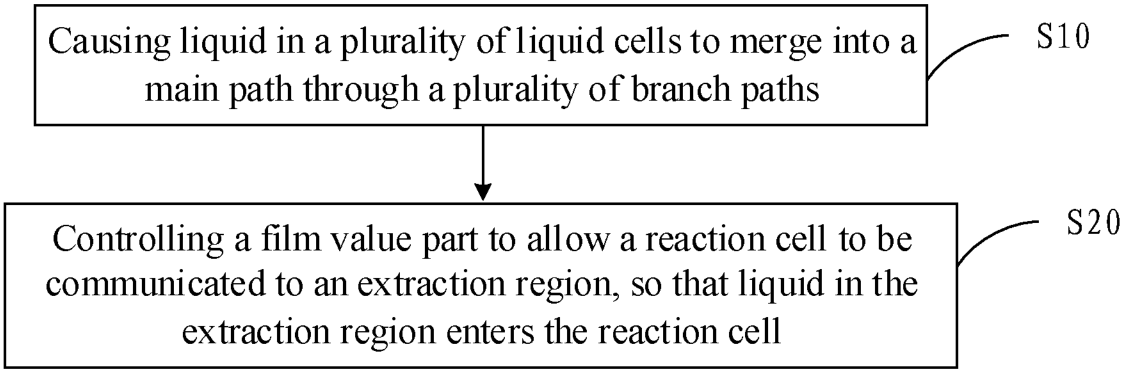
FIG. 13 is a schematic flowchart of another method for using a detection chip provided by at least one embodiment of the present disclosure.

FIG. 13 is a schematic flowchart of another method for using a detection chip provided by at least one embodiment of the present disclosure.

For example, as illustrated in FIG. 13, in some examples, the method includes operations below.

Step S10: causing liquid in a plurality of liquid cells 12 to merge into a main path 111 through a plurality of branch paths 112; and Step S20: controlling the film value part 115 to allow the reaction cell 13 to be communicated to the extraction region 113, so that the liquid in the extraction region 113 enters the reaction cell 13.

For example, the step S10 in this embodiment is basically same as the step S10 of the method illustrated in FIG. 12, and is not repeated here. For example, in the step S20, in the case where the fluid channel 11 further includes a film valve part 115 and the chip substrate 10 includes a reaction cell 13, the liquid can be pumped by applying air pressure (for example, alternating positive air pressure and negative air pressure) to allow the liquid in the extraction region 113 to enter the reaction cell 13.

It should be noted that, in the embodiments of the present disclosure, the method may further include more steps, which may be determined as actually required, and is not limited in the embodiments of the present disclosure. For detailed description and technical effects of the method, reference may be made to the above description of the detection chip 100 and the detection apparatus 200, which may not be repeated here.

The following statements should be noted.

(1) The accompanying drawings involve only the structure(s) in connection with the embodiment(s) of the present disclosure, and other structure(s) can be referred to common design(s).

(2) In case of no conflict, features in one embodiment or in different embodiments can be combined to obtain new embodiments.

What have been described above are only specific implementations of the present disclosure, the protection scope of the present disclosure is not limited thereto, and the protection scope of the present disclosure should be based on the protection scope of the claims.

What is claimed is:

1. A detection chip, comprising a chip substrate, wherein the chip substrate comprises a fluid channel and a plurality of liquid cells, and the fluid channel is arranged on a surface of the chip substrate and comprises a main path and a plurality of branch paths, the plurality of branch paths are respectively communicated to the plurality of liquid cells, the plurality of branch paths are all communicated to the main path, communication points between the plurality of branch paths and the main path are different, and an included angle between at least one of the plurality of branch paths and the main path is an acute angle, the plurality of branch paths are configured to allow liquid in the plurality of branch paths to be capable of merging into the main path in a same direction and flowing in the main path long a merging direction under action of inertia, wherein the fluid channel further comprises an extraction region, and the extraction region is communicated to the main path;

the detection chip further comprises a sealing film, wherein the sealing film covers the surface of the chip substrate having the fluid channel, wherein the fluid channel further comprises a plurality of flow paths and a plurality of film valve parts, the chip substrate further comprises a reaction cell and a waste liquid cell, the reaction cell is configured to contain liquid that needs to be subjected to an amplification reaction, and the waste liquid cell is configured to contain waste liquid generated in the extraction region during reaction process, and the reaction cell and the waste liquid cell are respectively communicated to the extraction region through the plurality of flow paths, the plurality of film valve parts are respectively in the plurality of flow paths, and a film valve part of the plurality of film valve parts is configured to allow a portion of the sealing film covering the film valve part to approach and separate, so as to correspondingly close and open a flow path, wherein the reaction cell comprises a porous structure, the porous structure comprises a plurality of pore-shaped parts, and the plurality of pore-shaped parts are configured to contain same or different amplification primers, wherein the porous structure further comprises a connecting channel and a plurality of connecting byroads, the plurality of connecting byroads are all communicated to the connecting channel, and an extending direction of the connecting byroads is perpendicular to an extending direction of the connecting channel, and the plurality of pore-shaped parts are respectively communicated to the plurality of connecting byroads, respectively, and the plurality of pore-shaped parts are arranged in a row along a direction parallel to the extending direction of the connecting channel.

2. The detection chip according to claim 1, wherein an aspect ratio of any one of the main path and the branch paths of the fluid channel ranges from 0.4 to 0.6.

3. The detection chip according to claim 1, wherein the sealing film comprises an elastic film.

4. The detection chip according to claim 1, wherein the pore-shaped parts comprise air-permeable holes, and the air-permeable holes are covered with an air-permeable and liquid-impermeable film.

5. The detection chip according to claim 1, wherein a liquid cell of the plurality of liquid cells comprises a double-layer film sealing structure, the double-layer film sealing structure comprises two layers of liquid sealing films, the two layers of liquid sealing films are stacked in a direction perpendicular to the chip substrate and have a spacing, and the two layers of liquid sealing films define an enclosed space in the liquid cell.

6. The detection chip according to claim 5, further comprising a piercing mechanism and a piercing mechanism limit plate, wherein the piercing mechanism comprises a plurality of columnar parts, the piercing mechanism limit plate is arranged on a side of the chip substrate away from the fluid channel, and comprises a plurality of openings corresponding to the plurality of columnar parts, and the plurality of columnar parts are arranged in the plurality of openings.

7. The detection chip according to claim 6, wherein a columnar part of the plurality of columnar parts is movable in an opening along an axial direction of the opening, and is configured to not only pierce the double-layer film sealing structure but also seal the liquid cell.

8. The detection chip according to claim 7, wherein an end of the columnar part close to the chip substrate is made of a rigid material, and an end of the columnar part away from the chip substrate is made of an elastic material.

9. The detection chip according to claim 1, further comprising an adhesive layer, wherein the adhesive layer is between the chip substrate and the sealing film, and is configured to adhere the chip substrate to the sealing film, and the adhesive layer exposes the fluid channel of the chip substrate.

10. A detection apparatus, adapted to operate a detection chip, wherein the detection apparatus comprises a piercing mechanism control unit, the detection chip comprises a chip substrate, the chip substrate comprises a fluid channel and a plurality of liquid cells, and the fluid channel is arranged on a surface of the chip substrate and comprises a main path and a plurality of branch paths, the plurality of branch paths are respectively communicated to the plurality of liquid cells, the plurality of branch paths are all communicated to the main path, communication points between the plurality of branch paths and the main path are different, and an included angle between at least one of the plurality of branch paths and the main path is an acute angle, the plurality of branch paths are configured to allow liquid in the plurality of branch paths to be capable of merging into the main path in a same direction and flowing in the main path long a merging direction under action of inertia, wherein the fluid channel further comprises an extraction region, and the extraction region is communicated to the main path;

the detection chip further comprises a sealing film, wherein the sealing film covers the surface of the chip substrate having the fluid channel, wherein the fluid channel further comprises a plurality of flow paths and a plurality of film valve parts, the chip substrate further comprises a reaction cell and a waste liquid cell, the reaction cell is configured to contain liquid that needs to be subjected to an amplification reaction, and the waste liquid cell is configured to contain waste liquid generated in the extraction region during reaction process, and the reaction cell and the waste liquid cell are respectively communicated to the extraction region through the plurality of flow paths, the plurality of film valve parts are respectively in the plurality of flow paths, and a film valve part of the plurality of film valve parts is configured to allow a portion of the sealing film covering the film valve part to approach and separate, so as to correspondingly close and open a flow path, wherein the reaction cell comprises a porous structure, the porous structure comprises a plurality of pore-shaped parts, and the plurality of pore-shaped parts are configured to contain same or different amplification primers, wherein the porous structure further comprises a connecting channel and a plurality of connecting byroads, the plurality of connecting byroads are all communicated to the connecting channel, and an extending direction of the connecting byroads is perpendicular to an extending direction of the connecting channel, and the plurality of pore-shaped parts are respectively communicated to the plurality of connecting byroads, respectively, and the plurality of pore-shaped parts are arranged in a row along a direction parallel to the extending direction of the connecting channel;

in a case where the detection chip comprises a piercing mechanism and the liquid cell comprises a double-layer film sealing structure, the piercing mechanism control unit is configured to be capable of installing the detection chip, and in a case where the detection chip is installed in the piercing mechanism control unit, the piercing mechanism control unit is configured to control the piercing mechanism to pierce the double-layer film sealing structure, so that the liquid in the plurality of liquid cells flows into the extraction region through the main path.

11. The detection apparatus according to claim 10, further comprising a film valve control unit and a film drive unit, wherein the film valve control unit comprises at least one protruding part, and the at least one protruding part is movable to control whether a portion of the sealing film covering the film valve part approaches the film valve part, or is separated from the film valve part in the case where the detection chip is installed in the piercing mechanism control unit, so as to correspondingly close and open the flow path, and the film drive unit is configured to apply pressure to a portion of the sealing film covering the extraction region in the case where the detection chip is installed in the piercing mechanism control unit, so that the portion of the sealing film covering the extraction region is deformed.

12. A method for using a detection chip, wherein the detection chip comprises a chip substrate, the chip substrate comprises a fluid channel and a plurality of liquid cells, and the fluid channel is arranged on a surface of the chip substrate and comprises a main path and a plurality of branch paths, the plurality of branch paths are respectively communicated to the plurality of liquid cells, the plurality of branch paths are all communicated to the main path, communication points between the plurality of branch paths and the main path are different, and an included angle between at least one of the plurality of branch paths and the main path is an acute angle, the plurality of branch paths are configured to allow liquid in the plurality of branch paths to be capable of merging into the main path in a same direction and flowing in the main path long a merging direction under action of inertia, wherein the fluid channel further comprises an extraction region, and the extraction region is communicated to the main path;

the detection chip further comprises a sealing film, wherein the sealing film covers the surface of the chip substrate having the fluid channel, wherein the fluid channel further comprises a plurality of flow paths and a plurality of film valve parts, the chip substrate further comprises a reaction cell and a waste liquid cell, the reaction cell is configured to contain liquid that needs to be subjected to an amplification reaction, and the waste liquid cell is configured to contain waste liquid generated in the extraction region during reaction process, and the reaction cell and the waste liquid cell are respectively communicated to the extraction region through the plurality of flow paths, the plurality of film valve parts are respectively in the plurality of flow paths, and a film valve part of the plurality of film valve parts is configured to allow a portion of the sealing film covering the film valve part to approach and separate, so as to correspondingly close and open a flow path, wherein the reaction cell comprises a porous structure, the porous structure comprises a plurality of pore-shaped parts, and the plurality of pore-shaped parts are configured to contain same or different amplification primers, wherein the porous structure further comprises a connecting channel and a plurality of connecting byroads, the plurality of connecting byroads are all communicated to the connecting channel, and an extending direction of the connecting byroads is perpendicular to an extending direction of the connecting channel, and the plurality of pore-shaped parts are respectively communicated to the plurality of connecting byroads, respectively, and the plurality of pore-shaped parts are arranged in a row along a direction parallel to the extending direction of the connecting channel; and the method comprises:

causing the liquid in the plurality of liquid cells to merge into the main path through the plurality of branch paths.

* * * * *